(12) United States Patent
Ai et al.

(10) Patent No.: US 11,186,526 B2
(45) Date of Patent: Nov. 30, 2021

(54) METHOD FOR PREPARING ORGANIC BORON FERTILIZER FOR ENGINEERING WOUND SOIL REMEDIATION AND PREPARED ORGANIC BORON FERTILIZER

(71) Applicant: Sichuan University, Sichuan (CN)

(72) Inventors: Yingwei Ai, Sichuan (CN); Siqian Yang, Sichuan (CN); Shenghao Ai, Sichuan (CN); Jia Liu, Sichuan (CN); Xiaoyan Ai, Sichuan (CN)

(73) Assignee: Sichuan University, Sichuan (CN)

( * ) Notice: Subject to any disclaimer, the term of this patent is extended or adjusted under 35 U.S.C. 154(b) by 190 days.

(21) Appl. No.: 16/566,882

(22) Filed: Sep. 11, 2019

(65) Prior Publication Data
US 2020/0123075 A1    Apr. 23, 2020

(30) Foreign Application Priority Data
Oct. 22, 2018    (CN) .......................... 201811228285.9

(51) Int. Cl.
| | | |
|---|---|---|
| *C05F 11/00* | (2006.01) | |
| *C05G 5/23* | (2020.01) | |
| *C05G 3/80* | (2020.01) | |
| *C05F 17/05* | (2020.01) | |
| *C05D 9/02* | (2006.01) | |

(52) U.S. Cl.
CPC .............. *C05F 11/00* (2013.01); *C05D 9/02* (2013.01); *C05F 17/05* (2020.01); *C05G 3/80* (2020.02); *C05G 5/23* (2020.02)

(58) Field of Classification Search
None
See application file for complete search history.

(56) References Cited

U.S. PATENT DOCUMENTS 5,720,793 A * 2/1998 Kato .................. C05C 5/04
                                                      71/16
2017/0356002 A1* 12/2017 Thompson ........... C12Y 302/01

FOREIGN PATENT DOCUMENTS

| CN | 104478624 A | * | 2/2015 | ............. C05B 13/06 |
| CN | 107318465 A | * | 11/2017 | ............... C05B 7/00 |
| CN | 107926555 A | * | 4/2018 | ............. C05C 11/00 |
| CN | 108046892 A | * | 5/2018 | ............. C05F 11/00 |

* cited by examiner

*Primary Examiner* — Wayne A Langel

(57) ABSTRACT

A method for preparing an organic boron fertilizer for engineering wound soil remediation includes a step of: effectively compounding at least one of chitin oligosaccharide, wormcast and silkworm excrement, at least one of water and hydrogen peroxide, an organic boron element solution, sodium alkyl benzene sulfonate and polysorbate under certain conditions. The present invention has significant effects on improving physical and chemical properties of engineering wound soil, enhancing availability of boron element in the soil, preventing plants from physiological diseases caused by lack of boron, and promoting growth and development of the plants.

1 Claim, No Drawings

METHOD FOR PREPARING ORGANIC BORON FERTILIZER FOR ENGINEERING WOUND SOIL REMEDIATION AND PREPARED ORGANIC BORON FERTILIZER

CROSS REFERENCE OF RELATED APPLICATION

The present invention claims priority under 35 U.S.C. 119(a-d) to CN 201811228285.9, filed Oct. 22, 2018.

BACKGROUND OF THE PRESENT INVENTION

Field of Invention

The present invention relates to a fertilizer, and most particularly related to a to method for preparing an organic boron fertilizer for engineering wound soil remediation and the corresponding prepared organic boron fertilizer.

Description of Related Arts

The rapid development of infrastructure such as roads, railways, and water conservancy has produced a large number of engineering wounds, which have changed the original topography and destroyed the original natural soil and vegetation. Engineering wounds affect both the safety of the infrastructure and the deterioration of the natural environment, requiring timely ecological restoration. Soil restoration of engineering wounds is the basis for vegetation restoration of engineering wounds and also the main task of ecological restoration of engineering wounds. For the engineering wounds with very special habitats, soil remediation measures that use soil to pile up on the engineering wounds and carry out vegetation reconstruction in a specific way are effective ways for modern engineering wound management and ecological greening (as described in Chinese patent ZL 200810046488.6, and Chinese patent ZL 201510620706.2). Boron is an essential microelement for plants. The application of boron fertilizers is a fundamental measure to improve the soil fertility and ensure the boron nutrition supply to the plants. However, due to the lack of targeted and effective organic boron fertilizers, the common boron fertilizers purchased on the market for farmland soil are still applied in the process of engineering wound soil remediation, facing a series of production problems, such as unreasonable fertilizer application, uncoordinated nutrient supply, and low fertilizer utilization rate. As a result, the effects of soil fertilizing and vegetation recovering on the engineering wounds are not obvious.

SUMMARY OF THE PRESENT INVENTION

An object of the present invention is to provide a method for preparing an organic boron fertilizer for engineering wound soil remediation and the prepared organic boron fertilizer, so as to overcome shortcomings in the prior art. The present invention has characteristics of easily available raw materials, low production cost, stable performance, lasting fertilizer effect and high bio-availability. The present invention has significant effects on improving physical and chemical properties of engineering wound soil, enhancing availability of boron element in the soil, preventing plants from physiological diseases caused by lack of boron, and promoting growth and development of the plants.

In order to accomplish the above object, the present invention adopts technical solutions as follows.

A method for preparing an organic boron fertilizer for engineering wound soil remediation comprises steps of:

(1) adding at least one of chitin oligosaccharide, wormcast and silkworm excrement, with a weight percentage of 30%-70%, into a first reaction kettle; then adding at least one of water and hydrogen peroxide, with a weight percentage of 30%-70%, into the first reaction kettle for dissolution; stirring at 30-90° C. for 0.3-2 hours, and obtaining a first sample;

(2) adding at least one of sodium alginate, triethanolamine and glycerol, with a weight percentage of 15%-40%, into a second reaction kettle; dissolving by water with a weight percentage of 15%-40%; then adding at least one of hydrogen peroxide, sodium chlorate and ethanolamine, with a weight percentage of 1%-15%, into the second reaction kettle for dissolution; stirring at 30-90° C. for 0.2-3 hours; adding at least one of boric acid and borax, with a weight percentage of 30%-65% into the second reaction kettle; boiling at 80-130° C. for 0.5-6 hours, and obtaining a second sample; and (3) compounding the first sample, the second sample, sodium alkyl benzene sulfonate and polysorbate respectively with weight percentages of 5%-20%, 70%-90%, 0-6% and 0-6%, and obtaining the organic boron fertilizer.

An organic boron fertilizer for engineering wound soil remediation, which is prepared through the above method, comprises components of: a first sample, a second sample, sodium alkyl benzene sulfonate and polysorbate, wherein: the first sample comprises at least one of chitin oligosaccharide, wormcast and silkworm excrement, and at least one of water and hydrogen peroxide; the second sample comprises at least one of sodium alginate, triethanolamine and glycerol, water, at least one of hydrogen peroxide, sodium chlorate and ethanolamine, and at least one of boric acid and borax.

The present invention has following beneficial effects.

The present invention overcomes the shortcomings in the prior art and has the characteristics of easily available raw materials, low production cost, stable performance, lasting fertilizer effect and high bio-availability. The present invention has significant effects on improving physical and chemical properties of engineering wound soil, enhancing availability of boron element in the soil, preventing plants from physiological diseases caused by lack of boron, and promoting growth and development of the plants.

DETAILED DESCRIPTION OF THE PREFERRED EMBODIMENT

The present invention will be further explained with preferred embodiments as follows.

First Preferred Embodiment

Adding chitin oligosaccharide with a weight percentage of 50% into a first reaction kettle; then adding water with a weight percentage of 50% into the first reaction kettle for dissolution; stirring at 80° C. for 0.5 hours, and obtaining a chitin oligosaccharide solution. Adding sodium alginate with a weight percentage of 20% into a second reaction kettle; dissolving by water with a weight percentage of 30%; then adding ethanolamine with a weight percentage of 10% into the second reaction kettle for dissolution; stirring at 80° C. for 0.5 hours; adding boric acid with a weight percentage of 40% into the second reaction kettle; boiling at 100° C. for 0.5 hours, and obtaining an organic boron element solution. Compounding the chitin oligosaccharide solution, the organic boron element solution, sodium alkyl benzene sulfonate and polysorbate respectively with weight percentages of 5%, 90%, 20‰ and 3%; and, obtaining a final product which is an organic boron fertilizer.

The obtained organic boron fertilizer of the present invention was applied in engineering wound soil remediation, and a vegetation recovery comparative experiment was carried out by using ryegrass. The comparative experiment showed that: compared with COMPO liquid boron fertilizer (developed by COMPO GmbH, Germany) and a control group without boron fertilizer, the organic boron fertilizer of the present invention can promote the growth and development of ryegrass, and significantly increase the chlorophyll content of ryegrass, thereby achieving a good vegetation recovery effect (see Table 1).

TABLE 1

Influence of organic boron fertilizer of present invention on growth and development of ryegrass in engineering wounds

| Treatment | Plant height (cm) | Panicle length (cm) | Chlorophyll content (mg/cm$^2$) | Vegetation coverage (%) |
|---|---|---|---|---|
| Control group without boron fertilizer | 81 | 12.5 | 0.033 | 90 |
| Commercial boron fertilizer (COMPO liquid boron fertilizer) | 83 | 13.8 | 0.041 | 94 |
| Organic boron fertilizer of present invention | 87 | 16.1 | 0.057 | 100 |

Second Preferred Embodiment

The operating procedure during preparation is the same as that in the first preferred embodiment. However, type, quantity and dissolution temperature of the raw materials, stirring time, and boiling time are changed within the range specified by the operating procedure of the present invention. As a result, the organic boron fertilizer for engineering wound soil remediation of the present invention is also prepared.

What is claimed is:
1. A method for preparing an organic boron fertilizer for engineering wound soil remediation, comprising steps of:
(1) adding at least one member selected from a group consisting of chitin oligosaccharide, wormcast and silkworm excrement, with a weight percentage of 30%-70%, into a first reaction kettle; then adding at least one member selected from a group consisting of water and hydrogen peroxide, with a weight percentage of 30%-70%, into the first reaction kettle for dissolution; stirring at 30-90° C. for 0.3-2 hours, and obtaining a first sample;
(2) adding at least one member selected from a group consisting of sodium alginate, triethanolamine and glycerol, with a weight percentage of 15%-40%, into a second reaction kettle; dissolving by water with a weight percentage of 15%-40%; then adding at least one member selected from a group consisting of hydrogen peroxide, sodium chlorate and ethanolamine, with a weight percentage of 1%-15%, into the second reaction kettle for dissolution; stirring at 30-90° C. for 0.2-3 hours; adding at least one member selected from a group consisting of boric acid and borax, with a weight percentage of 30%-65% into the second reaction kettle; boiling at 80-130° C. for 0.5-6 hours, and obtaining a second sample; and
(3) compounding the first sample, the second sample, sodium alkyl benzene sulfonate and polysorbate respectively with weight percentages of 5%-20%, 70%-90%, 0-6% and 0-6%, and obtaining the organic boron fertilizer.

* * * * *